US012429073B2

(12) United States Patent
Lacina et al.

(10) Patent No.: US 12,429,073 B2
(45) Date of Patent: Sep. 30, 2025

(54) CYLINDER WITH AUTOMATIC HYDRAULIC FLUID CIRCULATION

(71) Applicant: Milwaukee Cylinder Enterprises, LLC, Cudahy, WI (US)

(72) Inventors: Douglas Lacina, Franklin, WI (US); Joseph Logue, Milwaukee, WI (US); Fred Borak, Greenfield, WI (US); Pete Frymark, Cudahy, WI (US)

(73) Assignee: Milwaukee Cylinder Enterprises, LLC, Cudahy, WI (US)

( * ) Notice: Subject to any disclaimer, the term of this patent is extended or adjusted under 35 U.S.C. 154(b) by 0 days.

(21) Appl. No.: 17/698,614

(22) Filed: Mar. 18, 2022

(65) Prior Publication Data

US 2022/0299048 A1 Sep. 22, 2022

Related U.S. Application Data

(60) Provisional application No. 63/162,754, filed on Mar. 18, 2021.

(51) Int. Cl.
*F15B 15/14* (2006.01)
*F15B 15/22* (2006.01)
*F15B 15/20* (2006.01)

(52) U.S. Cl.
CPC ........ *F15B 15/1447* (2013.01); *F15B 15/149* (2013.01); *F15B 15/225* (2013.01); *F15B 15/1485* (2013.01); *F15B 15/204* (2013.01)

(58) Field of Classification Search
CPC .. F15B 15/1447; F15B 15/149; F15B 15/225; F15B 15/204
See application file for complete search history.

(56) References Cited

U.S. PATENT DOCUMENTS 3,587,407 A * 6/1971 Wilson, Jr. .......... F15B 15/1466 91/422
3,654,834 A * 4/1972 Sifri ...................... F15B 15/225 91/401
3,878,763 A * 4/1975 Lang ...................... B62D 5/061 60/494
4,023,363 A * 5/1977 Liebert .................. B62D 12/00 91/401
4,337,687 A * 7/1982 Hoover ............... F15B 15/1447 91/401
4,687,449 A * 8/1987 Fenrich ............... F15B 15/1447 91/401
4,729,283 A * 3/1988 Hillier ................. F16K 15/1823 91/401
5,425,305 A * 6/1995 Mauritz ................ F15B 15/204 92/143
6,089,931 A * 7/2000 Gorokawa ............. B63H 20/10 92/143

* cited by examiner

*Primary Examiner* — Dustin T Nguyen
(74) *Attorney, Agent, or Firm* — von Briesen & Roper, s.c.

(57) ABSTRACT

The claimed invention is an end-of-stroke recirculation system for use with a hydraulic cylinder. Generally speaking, the fluid in a hydraulic cylinder remains trapped on one side of the piston and is unable to recirculate. The claimed invention provides a bypass that allows for hydraulic fluid to circulate through a cylinder when the hydraulic cylinder is at either end or both ends of its stroke.

3 Claims, 11 Drawing Sheets

CYLINDER WITH AUTOMATIC HYDRAULIC FLUID CIRCULATION

FIELD OF THE INVENTION

The invention relates to an end-of-stroke recirculation system for use with a hydraulic cylinder. More specifically, the invention relates to a bypass that allows for hydraulic fluid to circulate through a cylinder when the hydraulic cylinder is at either end or both ends of its stroke.

BACKGROUND OF THE INVENTION

When a hydraulic cylinder reaches the end of its stroke, the hydraulic fluid is essentially trapped within the cylinder. Specifically, the hydraulic fluid within the cylinder is not permitted to circulate within the remainder of the hydraulic system, which means that it does not circulate through the cooling and filtering system. Such hot stagnant oil can decrease cylinder life.

Existing methods do not address the problem. For example, one method provides an orifice drilled through the piston. The problem with this technology is it allows bypass of the piston at all times, even when the piston is mid-stroke, which results in a loss in power and piston velocity.

Other methods include wrapping the cylinder with a cooling jacket, where oil/coolant flows through the cooling jacket. The problem with this technology is that the need for a cooling jacket increases the size of the cylinder and requires a separate set of cooling lines to feed the cooling jacket. In addition, the oil in the working part of the cylinder is still not circulated, it is merely cooled.

It would be advantageous to provide a hydraulic cylinder that permits the flow of fluid though the hydraulic cylinder when the piston is at the end of stroke position, which would permit filtered and cooled oil to circulate through the hydraulic system.

SUMMARY OF THE INVENTION

The claimed invention provides a technology that automatically allows hydraulic fluid to bypass the piston and cylinder cushion when the piston is physically at the end of its stroke. This technology can be configured to operate when the cylinder is fully extended, fully retracted, or both. The automatic recirculating technology uses opposite facing poppet valves with a common flow path through the piston with a physical means to unseat an initially closed poppet valve when the piston reaches the end-of-stroke and recirculation is desired. The claimed invention further provides for the closure of the poppet valve when the flow through the cylinder is reversed. The claimed invention further provides for a port that can be either larger or smaller depending upon flow requirements. The piston bypass technology may further provide for inserts located within the port such that the size of the bypass port can be varied to meet differing requirements.

In summary, in at least one embodiment, the claimed invention comprises a piston assembly for use in a hydraulic cylinder comprising: a barrel; a rod end and a blind end, the piston being attachable to a rod and comprising a rod end face and a blank end face, and an aperture through the piston from the rod end face to the blank end face; the piston further comprising a valve assembly situated within the aperture, the valve assembly being operable to open the valve if the valve contacts one of the rod end cap or the blind end cap and to close if the piston moves away from the rod end cap or the blind end cap.

The claimed invention may further comprise a hydraulic cylinder assembly comprising a cylinder; a piston disposed within the cylinder, the piston comprising an aperture; a piston rod connected to the piston, the piston rod being reciprocatingly received within the cylinder, the piston dividing the cylinder into a rod end hydraulic fluid chamber and a blind end hydraulic fluid chamber and being operable to move between a rod end cap and a blind end cap by increasing the pressure of the hydraulic fluid in the rod end hydraulic fluid chamber or the blind end hydraulic fluid chamber, the piston further comprising an aperture therethrough; and a valve assembly comprising a sleeve, the sleeve being removably insertable within the aperture in the piston and comprising a shoulder and at least one aperture sufficiently large to permit the passage of a hydraulic fluid and a poppet valve comprising a valve stem, a valve head comprising at least one fluid passage groove and a valve seat wherein the poppet valve is operable to open when the valve stem comes into contact with one of the rod end cap or the blind end cap and to allow the flow of hydraulic fluid through the apertures in the sleeve and across the at least one groove in the valve head and to close such that the valve seat comes into contact with the shoulder in the sleeve when the flow of hydraulic fluid through the cylinder is reversed.

DETAILED DESCRIPTION

Figure 1:
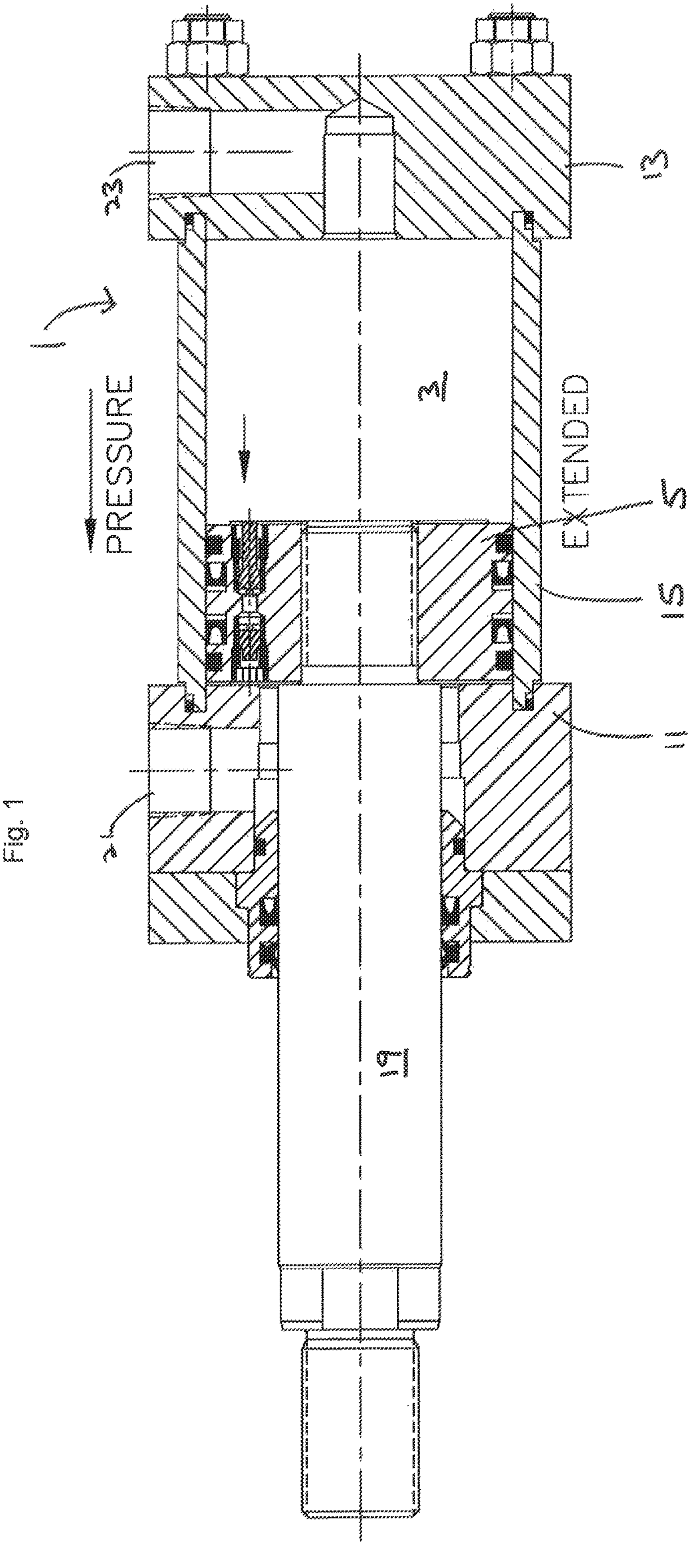
FIG. 1 shows a first embodiment of the claimed invention with the hydraulic cylinder rod being in the fully extended position wherein the poppet valve is on the blind end side of the poston and the plug valve is on the rod end side of the piston
Figure 2:
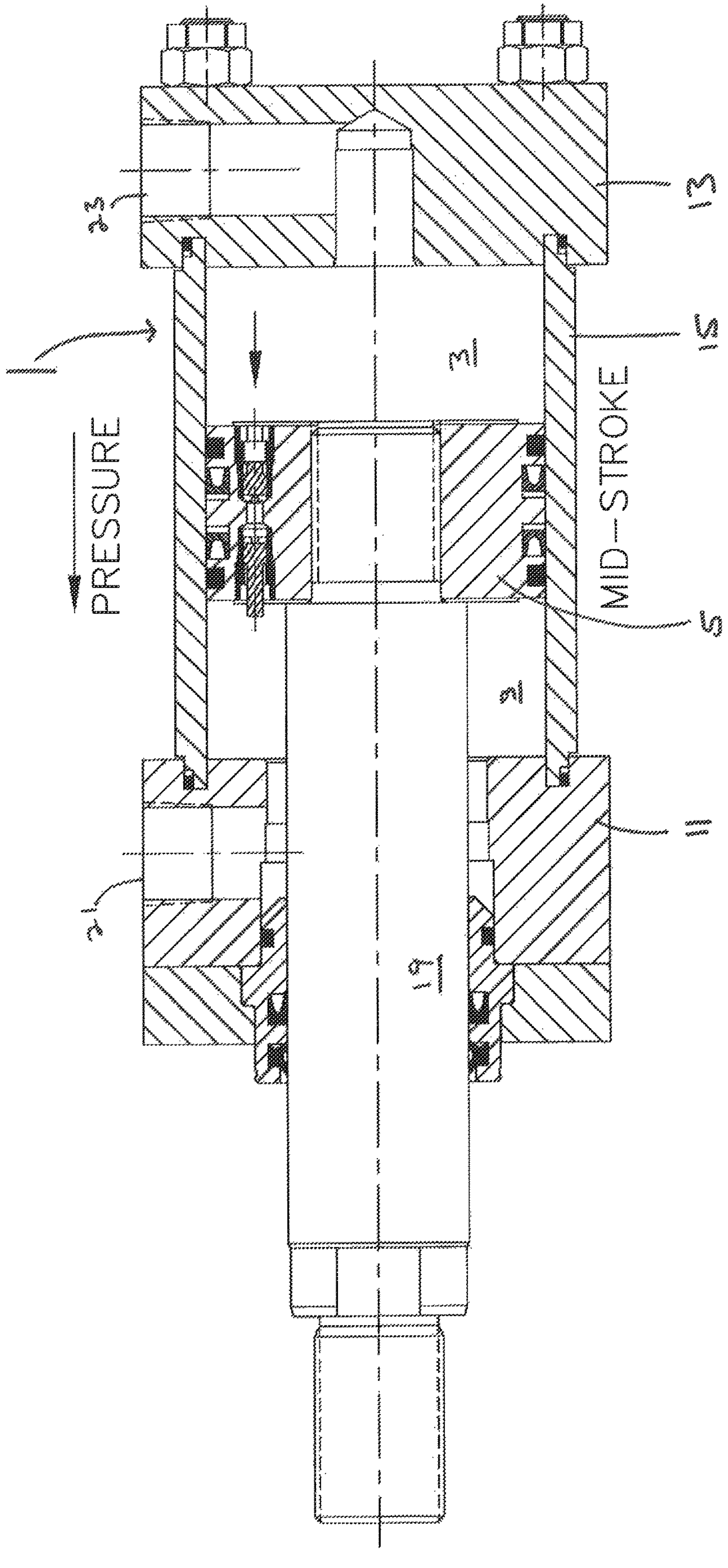
FIG. 2 shows a second embodiment of the claimed invention with the hydraulic cylinder rod being in the mid-stroke position and the poppet valve is on the rod end side of the piston and the plug valve is on the blank end side of the piston.
Figure 3:
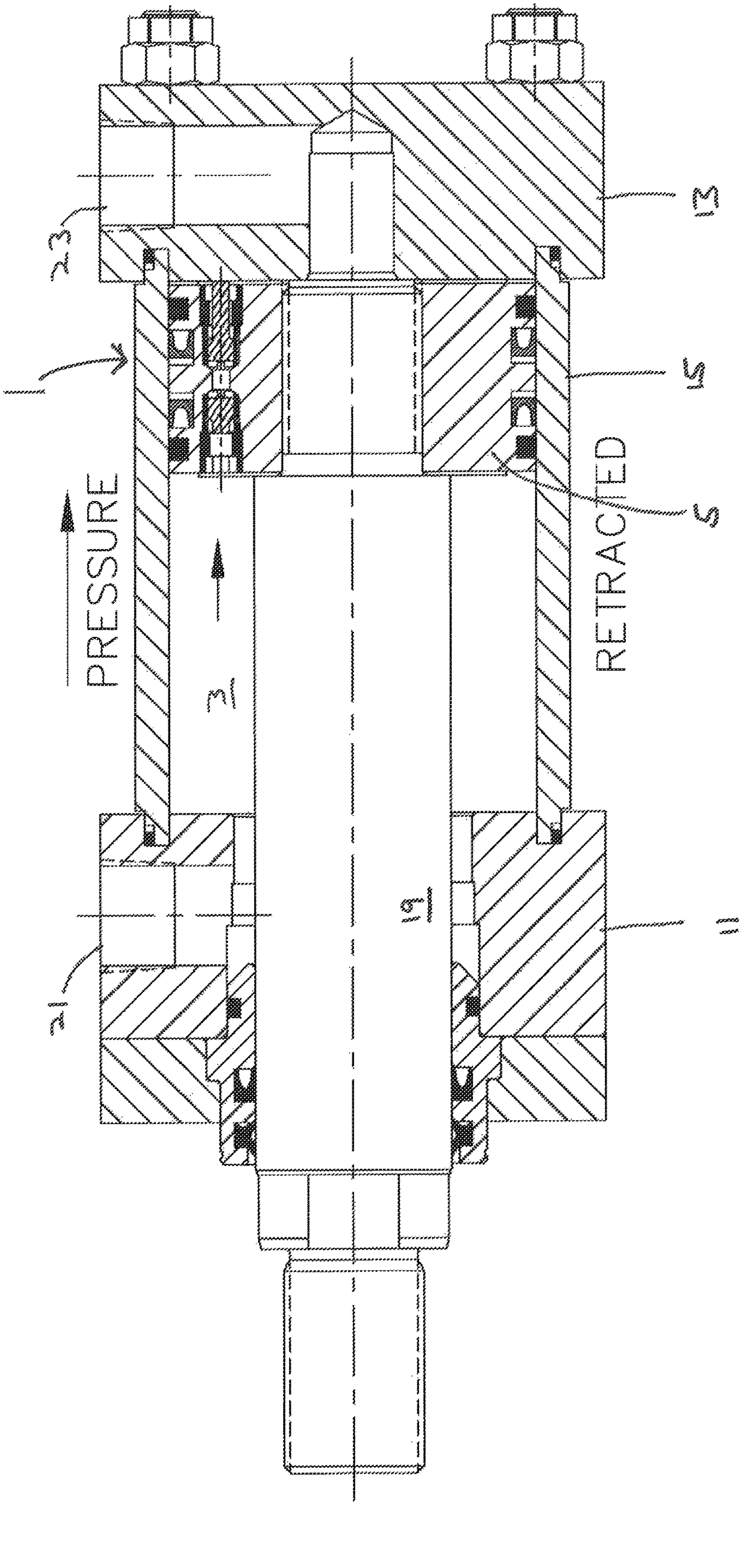
FIG. 3 shows the first embodiment of the claimed invention with the hydraulic cylinder rod being located in the fully retracted position.

Now referring to the drawings in detail, FIG. 1 shows a conventional hydraulic cylinder 1 comprising a cylinder wall or barrel 15, a rod end cap 11 and a blind end cap 13 and a piston 5 adapted to drive a rod 19 in a reciprocating manner. Piston 5 and rod 19 are actuated within the barrel 15 by alternately adding hydraulic fluid 3 to the rod end cap 11 side of the piston 5 or the blind end cap 13 side of the piston 5 via rod end inlet 21 or blind end inlet 23. Referring again to FIG. 1, which shows the hydraulic cylinder 1 in the fully extended position wherein the piston 5 is resting against the end cap 11. Referring now to FIG. 2, which shows the piston 5 in a mid-stroke position and extending toward the end cap 11. FIG. 3 shows the hydraulic cylinder 1 in the fully retracted position wherein the piston 5 is resting against the blind end cap 13. Typically, when the piston 5 is in either the fully extended position as shown in FIG. 1 or the fully retracted position as shown in FIG. 3, the hydraulic fluid 3 within the cylinder wall 15 of the hydraulic cylinder 1 is stagnant, that is, it cannot circulate, which leads to eventual degradation of the hydraulic fluid 3, which decreases the life of the hydraulic cylinder 1.

Figure 4:
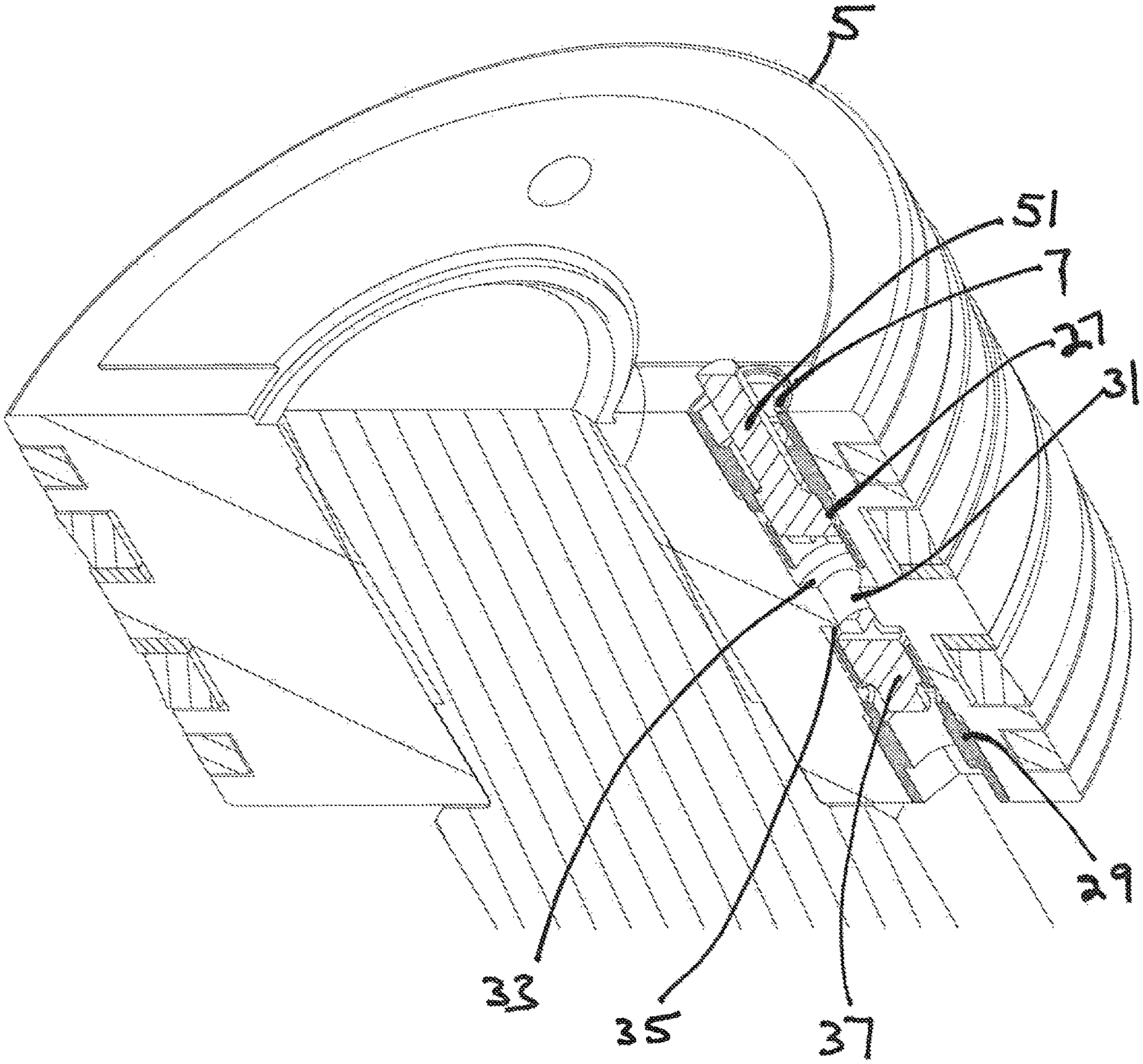
FIG. 4 shows an isometric cutaway view of the piston including the poppet valve assembly.
Figure 5:
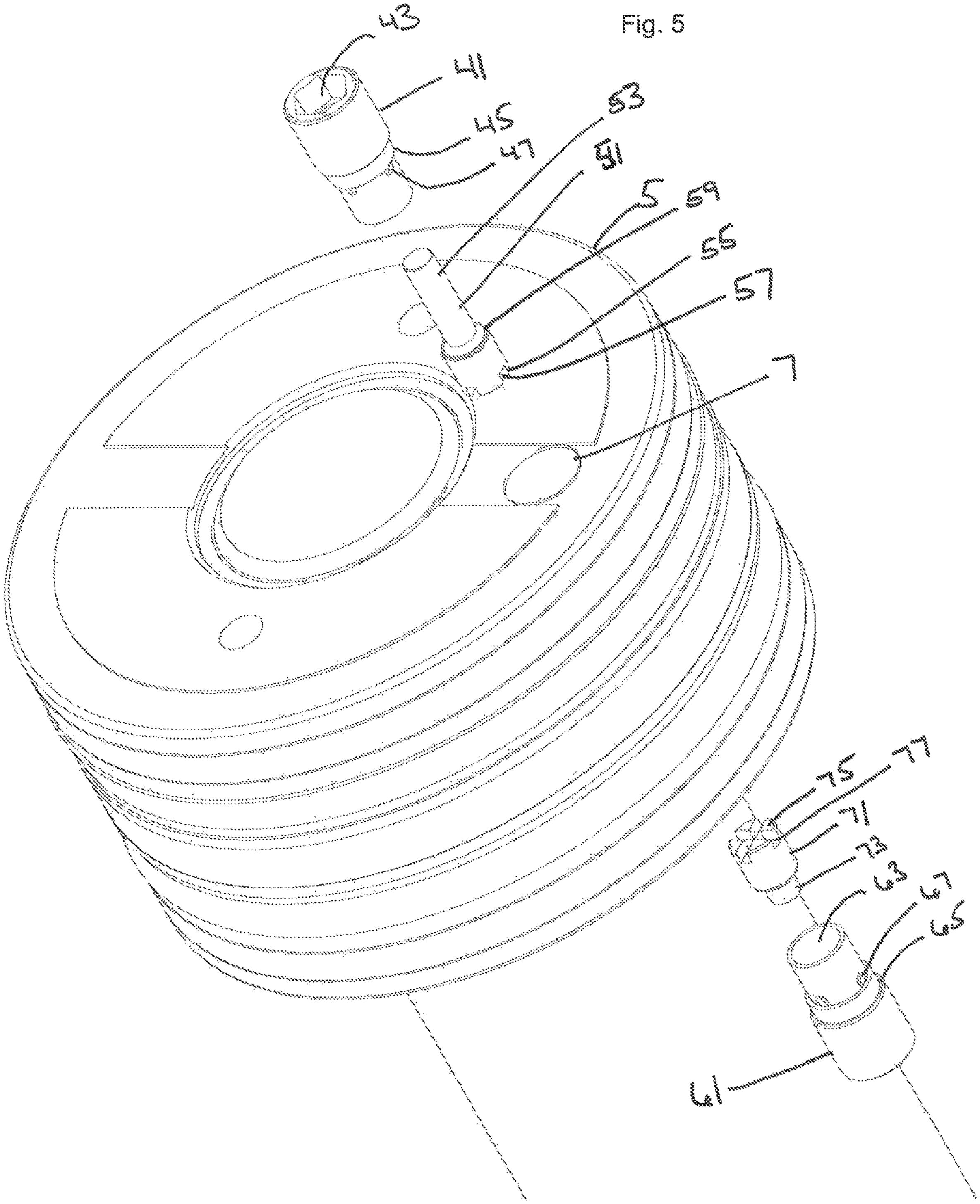
FIG. 5 shows an isometric exploded view of the piston showing the poppet valve assembly exploded out of the piston.

Now referring to FIG. 4, which shows a cutaway view of the piston 5 and FIG. 5 which shows an exploded view of the piston 5. As shown in FIGS. 4 and 5, the piston 5 further comprises an aperture therethrough or piston port 7. The piston port 7 is a provides for the controlled passage of hydraulic fluid 3 from the rod side of the piston 5 to the blind side of the piston 5. While leaving the piston port 7 open at all times would permit recirculation of the hydraulic fluid 3, it would reduce the speed and force with which the piston 5 moved. Piston port 7 further comprise a rod end insert section 27, a blank end insert section 29 and a narrow section 31. Narrow section 31 of port 25 creates a rod end shoulder 33 and a blank end shoulder 35.

Figure 6:
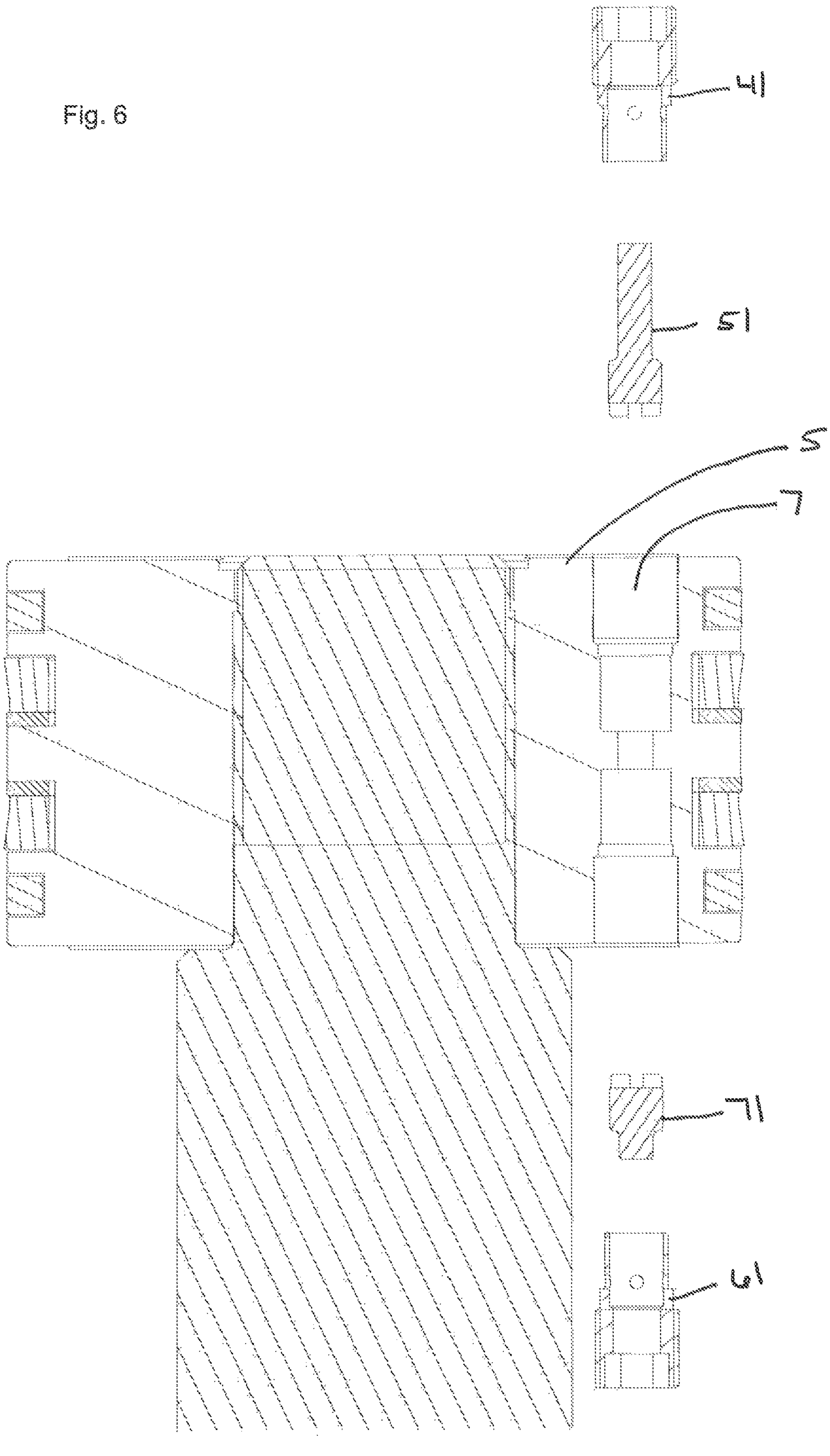
FIG. 6 shows a cutaway view of the piston bypass wherein the piston showing the poppet valve assembly exploded out of the piston.

Still referring to FIGS. 4, 5 and 6, shown are a poppet valve assembly 39 and a plug valve assembly 37. The poppet valve assembly 39 comprises a poppet insert 41 and a poppet valve 51. Poppet insert 41 is removably securable within the piston port 7. Poppet insert 41 further comprises a central aperture 43 and a shoulder 45. Poppet insert 41 further comprise a plurality of apertures 47. Apertures 47 in the poppet insert 41 permit the passage of hydraulic fluid 3 when the poppet valve 51 is open. Poppet valve 51 comprises a stem 53, a head 55 and a valve seat 59. Poppet valve 51 further comprises a plurality of grooves 57 in the head 55. Stem 53 of poppet valve 51 is operable to protrude from the piston port 7 when the poppet valve 51 is in the closed position, that is, when the valve seat 59 is pressed against the shoulder 45 of the poppet insert 41. Upon contact with the rod end cap 11 or the blind end cap 13, the poppet valve 51 opens and permits the flow of hydraulic fluid 3 through the piston port 7. In one embodiment, a poppet valve assembly 39 is situated on both sides of the piston 5. In such cases, hydraulic fluid may flow through the piston port 7 on both the rod end cap 11 and the blind end cap 13.

Referring again to FIGS. 4, 5 and 6, in some embodiments, opposite the poppet insert 41 is the plug valve assembly 37. The plug valve assembly 37 comprises plug insert 61 and plug valve 71. Plug insert 61 is removably securable within the piston port 7. Plug insert 61 further comprises a central aperture 63 and a shoulder 65. Plug insert 61 further comprises a plurality of apertures 67. Apertures 67 in the plug sleeve 61 permit the passage of hydraulic fluid 3 when the plug valve 71 is open. Plug valve 71 comprises a stem 73, a head 75 and a valve seat 79. Plug valve 71 further comprises a plurality of grooves 77 in the head 75. Stem 73 of plug valve 51 does not protrude from the piston port 7 and as a result will not open when the stem is contacts the rod end cap 11 or the blind end cap 13. Plug valve assembly is used when it is only desired to recirculate at one of the rod end cap 11 or blind end cap 13.

Figure 7:
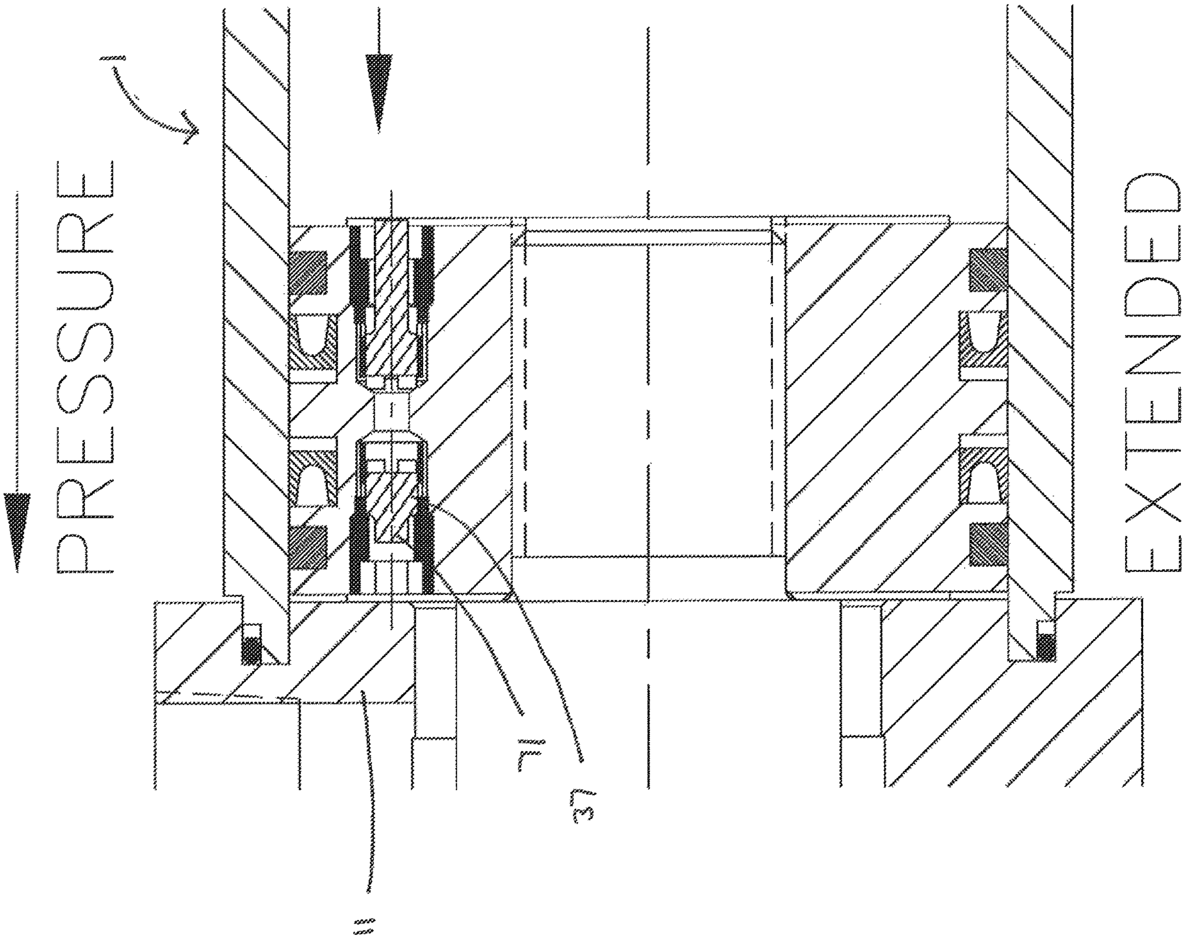
FIG. 7 shows a close-up cutaway view of the first embodiment of the piston bypass assembly wherein the piston is in the fully extended position and the poppet valve is on the rod end side of the piston.
Figure 8:
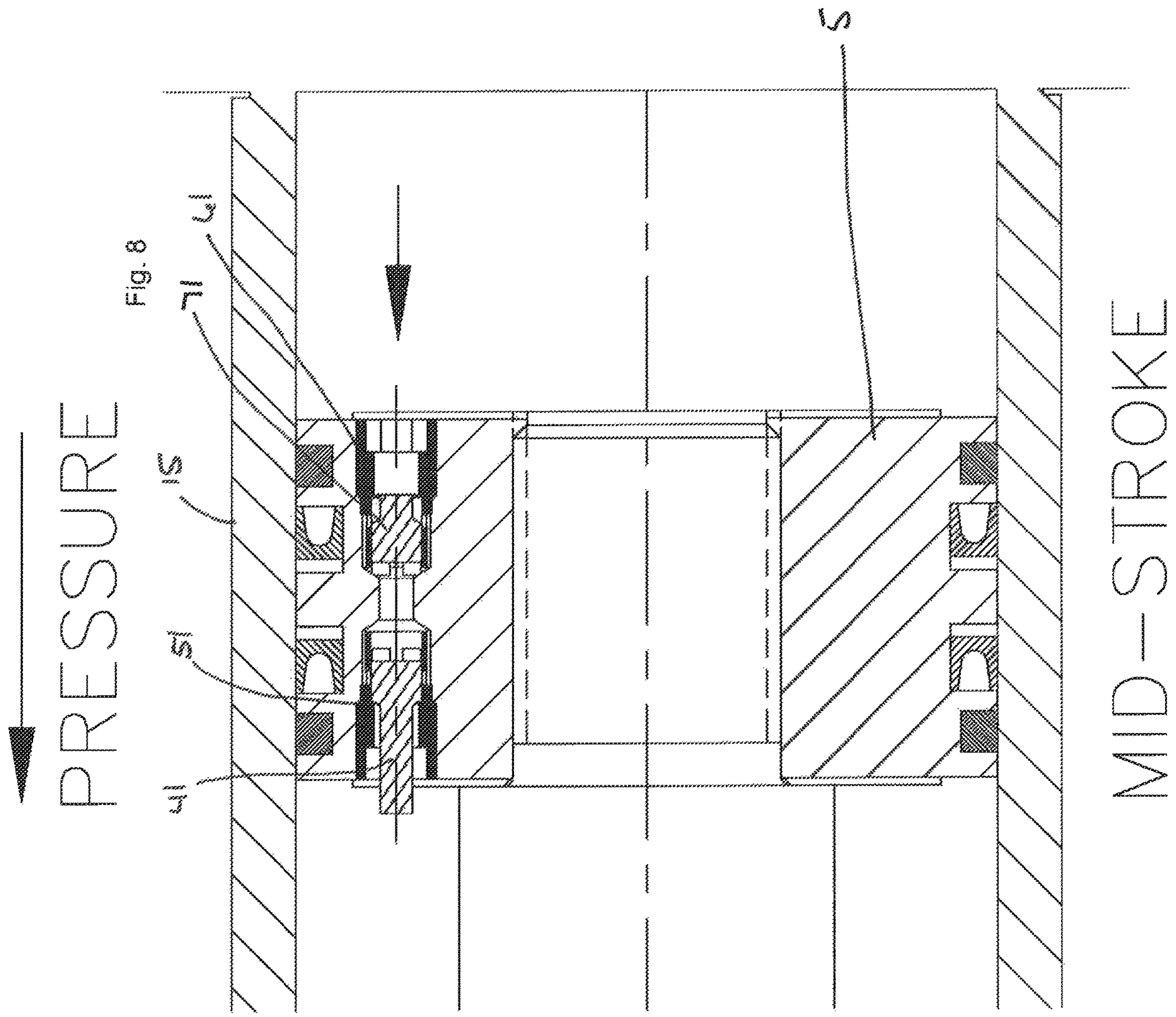
FIG. 8 shows a close-up cutaway view of the second embodiment of the piston bypass assembly wherein the piston is in the mid-stroke position and the poppet valve is on the blind end side of the piston.
Figure 9:
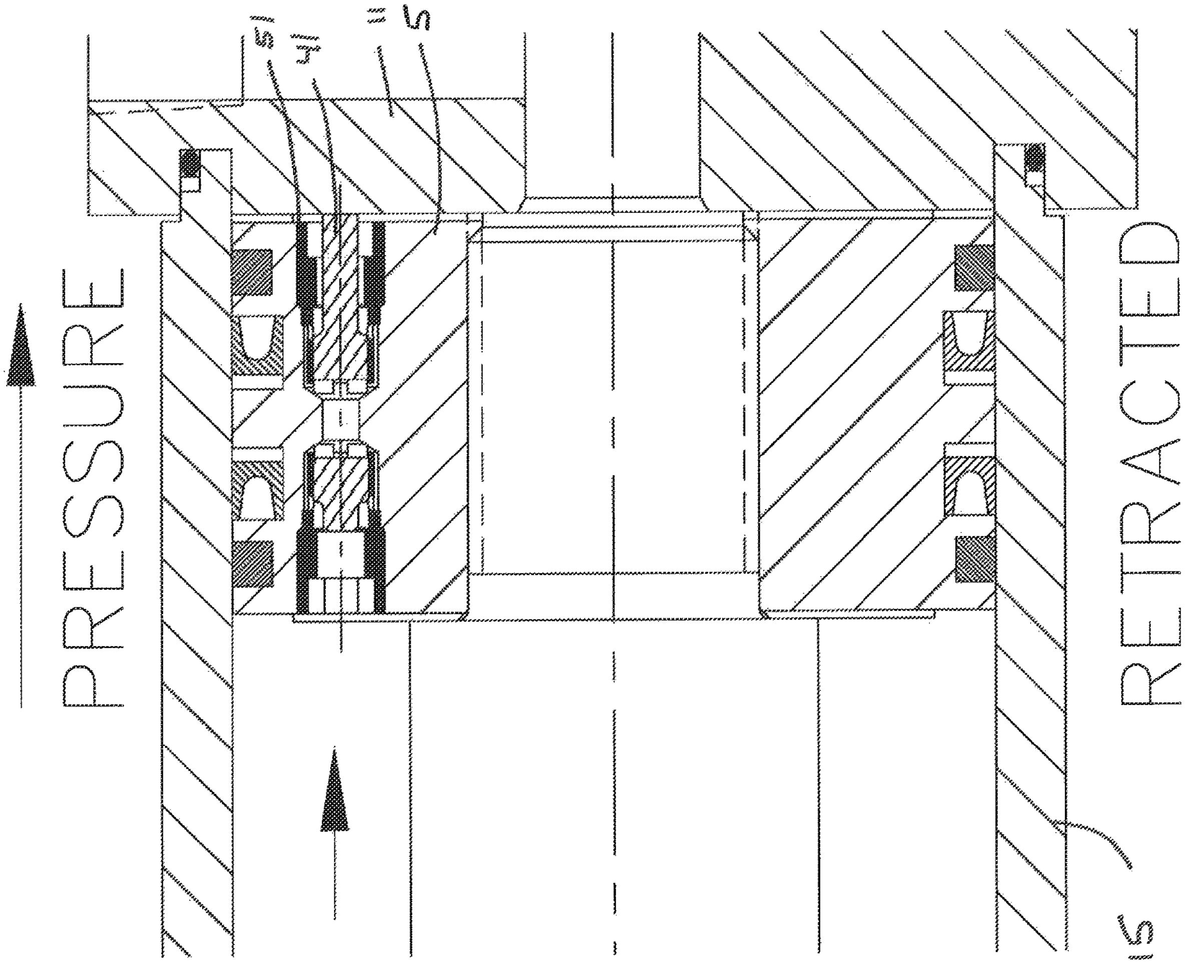
FIG. 9 shows a close-up cutaway view of the first embodiment of the piston bypass assembly wherein the piston is in the fully retracted position and the poppet valve is on the rod end side of the piston.

Now referring to FIGS. 7, 8 and 9, the Automatic Recirculating Cylinder, which show the operation of the hydraulic cylinder 1 in more detail. As shown in FIG. 8 when the piston 5 is mid-stroke, the poppet valve 51 is closed, that is, the valve seat 59 is sealed against the shoulder 55 of the sleeve insert 61. In this position, the piston 5 is operating normally. As can be seen, the stem 53 of the poppet valve is protruding from the rod end side of the piston 5. Still referring to FIG. 8, the plug valve 71 is also in the open position, that is, the head 75 of the plug valve 71 is not sealed against the blind end shoulder 35 of the piston port 25.

Referring now to FIG. 7, the piston 5 is located in its fully extended position. In this position, because the plug valve assembly is oriented against the rod end cap 11, the plug valve assembly 37 remains closed, that is, recirculation is not permitted. In an alternate embodiment, as shown in FIG. 8, the plug valve assembly 37 and the poppet valve assembly 39 would be reversed and recirculation would occur when the piston is located in the fully extended position. Referring now to FIG. 9, and again to the embodiment shown in FIG. 7, the piston 5 is in the fully retracted position against the rod end cap 11. In this position the poppet valve 51 is in contact with the rod end cap 11 and hydraulic fluid is able to circulate through the apertures 67 in the plug insert 61 and via the grooves 77 in the head 75 of the plug valve then past the poppet valve 51.

Figure 10:
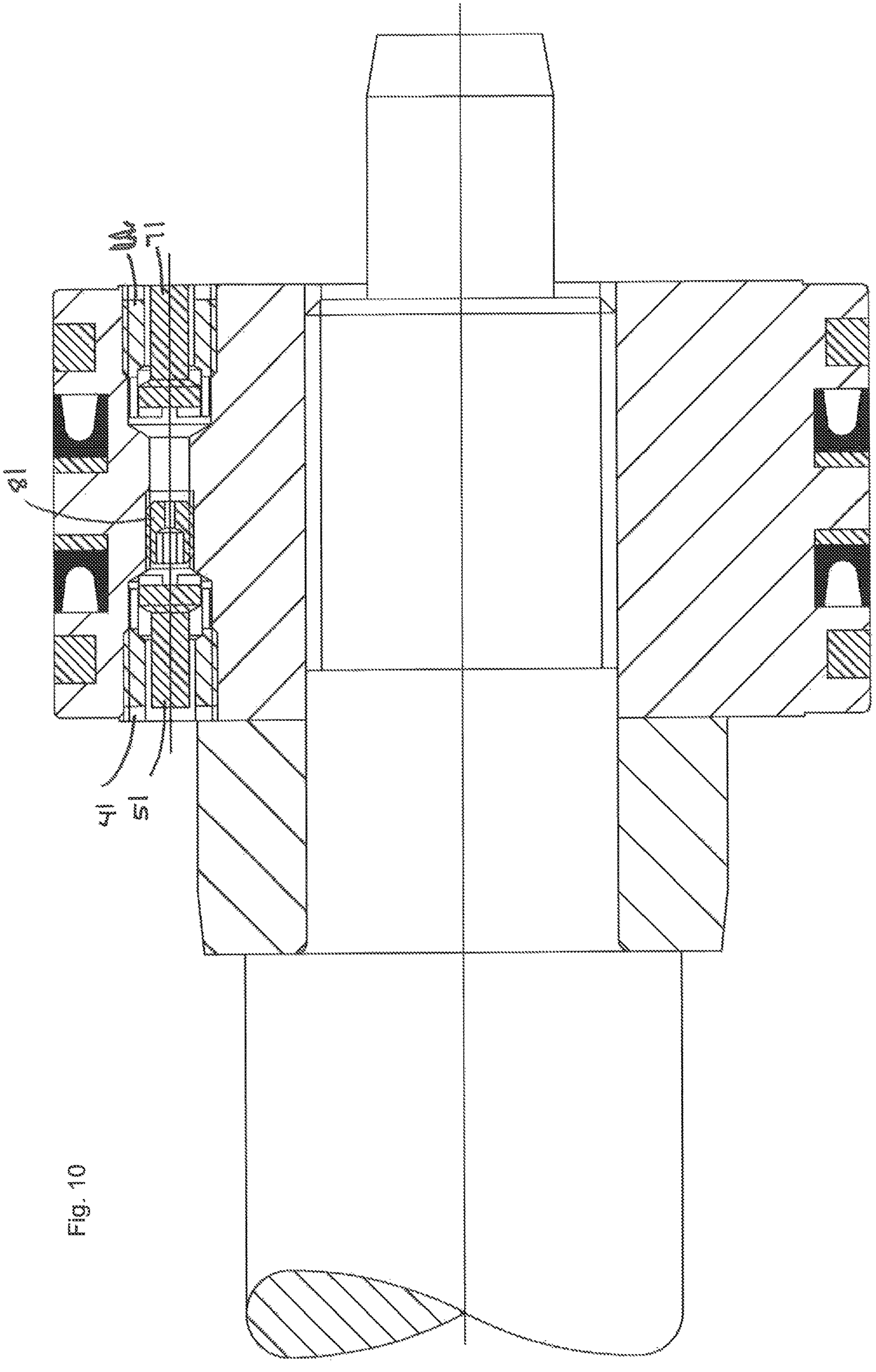
FIG. 10 shows a close-up cutaway view of the piston bypass assembly showing an insert having a relatively small aperture used to control the flow of hydraulic fluid through the piston bypass assembly.
Figure 11:
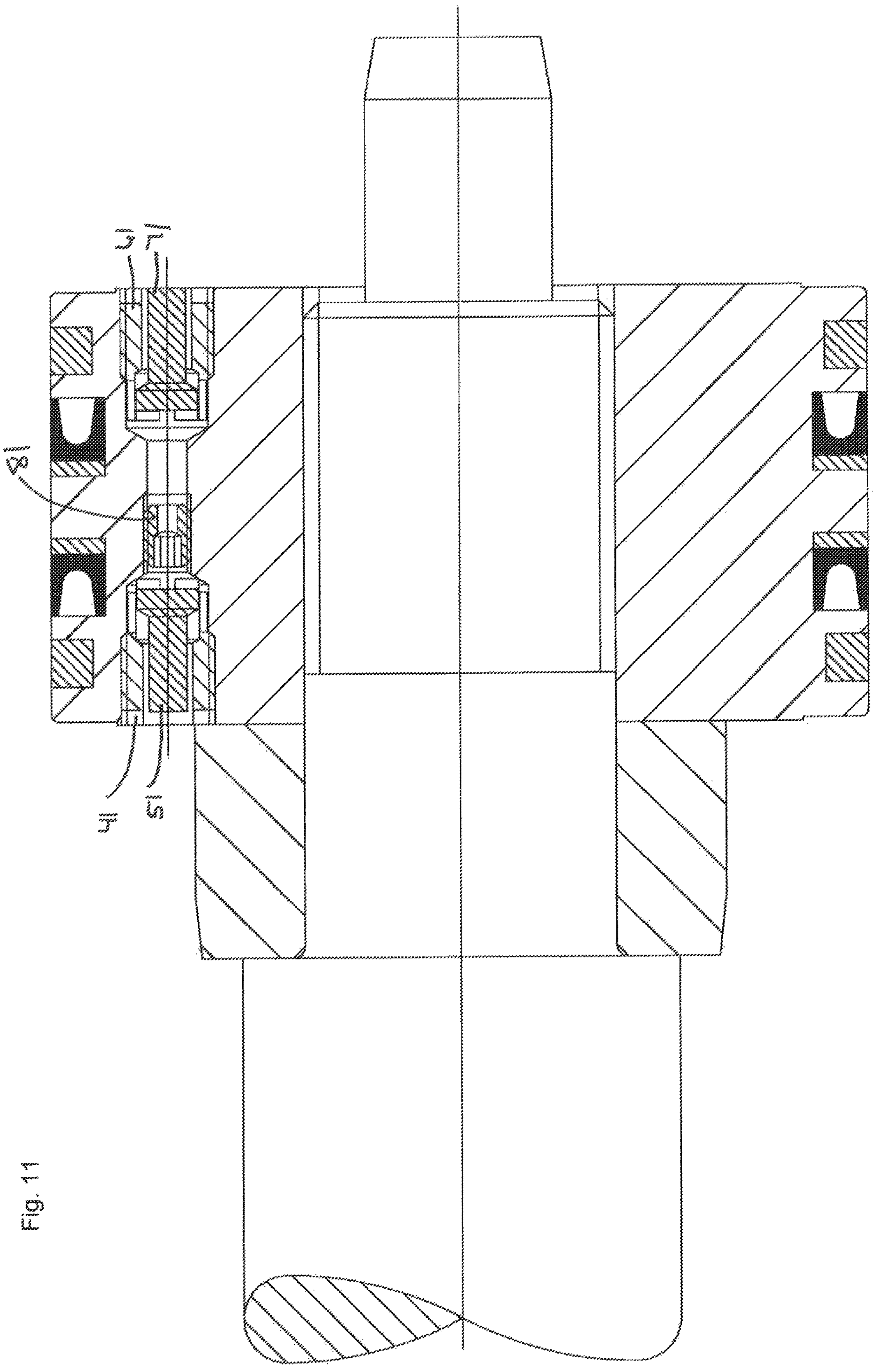
FIG. 11 shows a close-up cutaway view of the piston bypass assembly showing an insert having a relatively larger aperture used to control the flow of hydraulic fluid through the piston bypass assembly.

Referring now to FIGS. 10 and 11, it is possible to regulate the flow of hydraulic fluid 3 through the piston port 7 by in several ways. First, it may be possible to adjust the size of the narrow section 31 of the piston port 7. Alternatively, the size of the apertures 47, 67 in the plug insert and the poppet insert could be adjusted 67. In another embodiment, the size of the grooves 57, 77 in the heads 55, 75 of the poppet valve 51 and plug valve 71 could be adjusted. In a further embodiment, as shown in FIGS. 10 and 11, it would be possible to provide a removably securable flow control insert 81. FIG. 10 shows a flow control insert having a relatively smaller aperture, while FIG. 11 shows a flow control insert having a relatively larger aperture. It would also be possible to include the recirculating technology at both full extension and full retraction of the piston 5.

While the invention has been described with reference to specific embodiments, the description is illustrative of the invention and is not to be construed as limiting. Various modifications and applications of the invention may occur to those with skill in the art without departing from the spirit and scope of the invention.

What is claimed is:

1. A hydraulic cylinder comprising a rod end cap and a blind end cap and a piston that allows for hydraulic fluid to pass through the piston at the end of every stroke at the blind end cap side of the hydraulic cylinder, the hydraulic cylinder comprising:

a barrel having the rod end cap at one end and the blind end cap at the other end;

the piston slidingly disposed within the barrel, the piston comprising an aperture therethrough; the piston dividing the barrel into a rod end hydraulic fluid chamber and a blind end hydraulic fluid chamber wherein the piston is operable to move toward the rod end cap by increasing the pressure of the hydraulic fluid in the blind end hydraulic fluid chamber and to move toward the blind end cap by increasing the pressure of a hydraulic fluid in the rod end hydraulic fluid chamber;

a piston rod connected to the piston, the piston rod being reciprocatingly received within the barrel, and a valve assembly situated within the aperture in the piston, the valve assembly comprising a plug valve and a poppet valve wherein the plug valve is located on the rod end side and is operable to be opened by the pressure of the hydraulic fluid from the rod end hydraulic fluid chamber to permit the flow of hydraulic fluid through the plug valve and is operable to close by increasing the pressure of the hydraulic fluid from the blind end hydraulic fluid chamber;

wherein the poppet valve is located on the blind end side and is operable to be opened by the pressure of the hydraulic fluid from the blind end hydraulic chamber to permit the flow of hydraulic fluid through the poppet valve and is operable to close by increasing the pressure of the hydraulic fluid from the rod end hydraulic fluid chamber and wherein the poppet valve is operable to open each time the poppet valve contacts the blind end cap; to permit the passage of hydraulic fluid through the open plug valve and the poppet valve of the valve assembly;

wherein the plug valve and the poppet valve are never both closed at the same time; and wherein the plug valve is always open when the pressure in the rod end side hydraulic chamber increases and the poppet valve is always open when the pressure in the blind end side hydraulic chamber increases.

2. The hydraulic cylinder of claim 1 wherein the valve assembly is removably securable within the aperture.

3. The hydraulic cylinder of claim 1 further comprising a removably securable flow control device, the flow control device comprising an aperture to permit the flow of hydraulic fluid and being interchangeably replaceable with other flow control devices with apertures of different sizes.

* * * * *